United States Patent
Enomoto et al.

(10) Patent No.: US 12,206,204 B2
(45) Date of Patent: Jan. 21, 2025

(54) CONNECTOR CONNECTION STRUCTURE INCLUDING INTERNAL CONNECTOR POSITIONED INSIDE CASING AND ELECTRONIC CONTROL UNIT CONFIGURED TO BE ELECTRICALLY CONNECTED TO THE INTERNAL CONNECTOR

(71) Applicant: Nippon Tanshi Co., Ltd., Hiratsuka (JP)

(72) Inventors: Shinya Enomoto, Kanagawa (JP);
Osamu Nishimura, Kanagawa (JP);
Masaru Fujino, Kanagawa (JP);
Fumiaki Arimai, Tokyo (JP);
Hiroyoshi Nishizaki, Tokyo (JP)

(73) Assignee: Nippon Tanshi Co., Ltd., Hiratsuka (JP)

( * ) Notice: Subject to any disclaimer, the term of this patent is extended or adjusted under 35 U.S.C. 154(b) by 353 days.

(21) Appl. No.: 17/773,949

(22) PCT Filed: Oct. 8, 2020

(86) PCT No.: PCT/JP2020/038162
§ 371 (c)(1),
(2) Date: May 3, 2022

(87) PCT Pub. No.: WO2021/090634
PCT Pub. Date: May 14, 2021

(65) Prior Publication Data
US 2022/0376431 A1 Nov. 24, 2022

(30) Foreign Application Priority Data
Nov. 6, 2019 (JP) .................................. 2019-201171

(51) Int. Cl.
*H01R 13/52* (2006.01)
*H01R 12/72* (2011.01)

(52) U.S. Cl.
CPC ..... *H01R 13/5202* (2013.01); *H01R 13/5216* (2013.01); *H01R 13/5227* (2013.01); *H01R 12/721* (2013.01)

(58) Field of Classification Search
None
See application file for complete search history.

(56) References Cited

U.S. PATENT DOCUMENTS

| | | | | |
|---|---|---|---|---|
| 4,921,437 A | * | 5/1990 | Cooper | H01R 13/4223 439/655 |
| 7,074,057 B2 | * | 7/2006 | Chiran | H01R 13/6582 439/939 |

(Continued)

FOREIGN PATENT DOCUMENTS

| | | |
|---|---|---|
| JP | S 54-66687 | 5/1979 |
| JP | 2006-081714 | 3/2006 |
| JP | 2017-143287 | 8/2017 |

OTHER PUBLICATIONS

PCT International Search Report for corresponding PCT Application No. PCT/JP2020/038162, mailed Dec. 1, 2020, 5 pages.

*Primary Examiner* — Oscar C Jimenez
(74) *Attorney, Agent, or Firm* — Dority & Manning, P.A.

(57) ABSTRACT

To prevent electric conductance impairment of an electric connecting part between an electronic control unit and an internal connector in a reliable manner even when the electric connecting part between the electronic control unit and the internal connector is placed in an environment where oil mist or electroconductive substances are present, the electronic control unit includes a main part, a first conductive connection portion provided at a lower end of the main part and configured to be electrically connected to the (Continued)

internal connector, and an outer shell member extending downward so as to surround the first conductive connection portion, and to be open only at a lower end thereof, and wherein the internal connector is provided with a housing including a part defining an annular recess opened upward on an outer periphery thereof, the lower end of the outer shell member being received in the annular recess when the electronic control unit is connected to the internal connector.

6 Claims, 3 Drawing Sheets

(56) References Cited

U.S. PATENT DOCUMENTS

| | | | |
|---|---|---|---|
| 8,248,800 B2 * | 8/2012 | Takata | F16H 61/0006 165/80.4 |
| 2005/0032402 A1 * | 2/2005 | Takanashi | B60T 8/3675 439/76.2 |
| 2007/0123072 A1 * | 5/2007 | Maegawa | H03D 7/14 439/79 |
| 2011/0228478 A1 | 9/2011 | Takata et al. | |

* cited by examiner

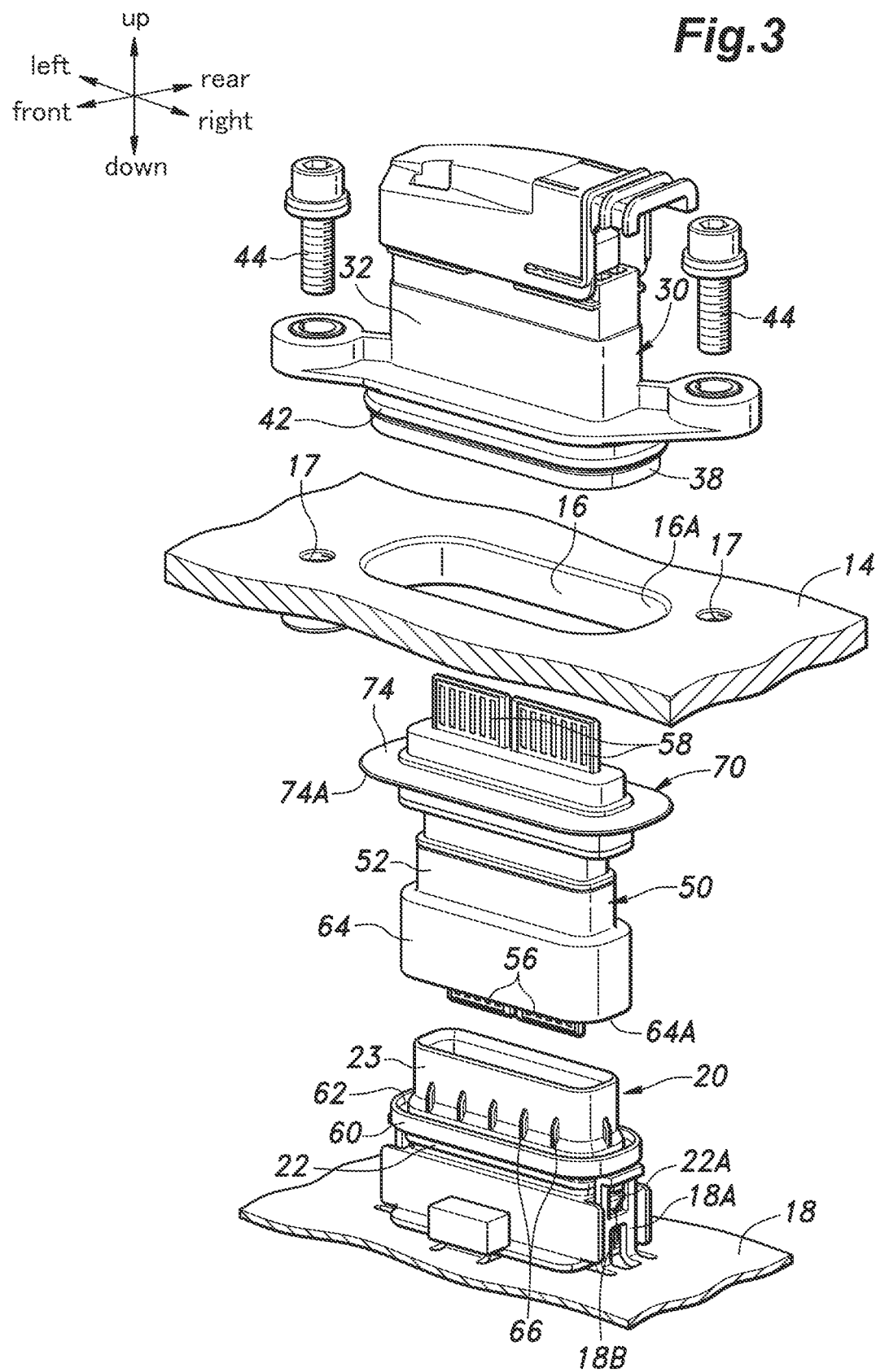

CONNECTOR CONNECTION STRUCTURE INCLUDING INTERNAL CONNECTOR POSITIONED INSIDE CASING AND ELECTRONIC CONTROL UNIT CONFIGURED TO BE ELECTRICALLY CONNECTED TO THE INTERNAL CONNECTOR

CROSS REFERENCE TO RELATED APPLICATIONS

This application is the U.S. National Stage entry of International Application No. PCT/JP2020/038162 filed under the Patent Cooperation Treaty on Oct. 8, 2020, which claims priority to Japanese Patent Application No. 2019-201171 filed on Nov. 6, 2019, both of which are incorporated herein by reference.

TECHNICAL FIELD

The present invention relates to a connector connection structure, and more particularly to a connector connection structure wherein an electronic control unit is connected to a connector.

BACKGROUND ART

In a known electronic control device, a casing accommodating an electronic control unit is directly connected to a control object device such an electric motor, and an electric connector for external connection is mounted to the casing.

PRIOR ART DOCUMENT(S)

Patent Document(s)

Patent Document 1: JP2017-143287A

SUMMARY OF THE INVENTION

Task to be Accomplished by the Invention

If oil mist is present in the interior of the casing containing the electronic control unit for the lubrication of mechanical components therein, the electric connecting part between the electronic control unit and a connector may be contaminated by the oil mist, and this may cause impairment of electric conductance. Also, if electroconductive substances such as metal dust are present in the interior of the casing, this may intrude into the electric connecting part between the electronic control unit and a connector, and this may cause impairment of electric conductance. Therefore, a seal is required in the electric connecting part between the electronic control unit and a connector so that foreign matters that may cause electric conductance impairment such as oil mist and electroconductive substances may be prevented from entering the electric connecting part between the electronic control unit and the connector.

If this sealing is performed by fitting a rubber seal member, the deterioration of the sealing performance due to the deterioration of the seal member over time becomes a problem. Further, when the seal member needs to have both oil resistance and heat resistance, it becomes necessary to use an expensive rubber material.

In addition, when the temperature difference between the inside and outside of the casing changes, such as when the casing forms the outer shell member of an engine or transmission, a pressure difference develops between the inside and outside of the casing with the result that the casing "breathes" air. Therefore, a seal member alone may not provide an adequate sealing performance.

In view of such a problem of the prior art, a primary object of the present invention is to prevent electric conductance impairment of an electric connecting part between an electronic control unit and an internal connector in a reliable manner even when the electric connecting part between the electronic control unit and the internal connector is placed in an environment where oil mist or electroconductive substances are present.

Means to Accomplish the Task

To achieve such an object, a certain aspect of the present invention provides a connector connection structure including an internal connector (20) positioned inside a casing (10), and an electronic control unit (50) configured to be electrically connected to the internal connector (20) from above with respect to the internal connector (20), wherein the electronic control unit (50) includes a main part (54), a first conductive connection portion (56) provided at a lower end of the main part (54) and configured to be electrically connected to the internal connector (20), and an outer shell member (64) extending downward so as to surround the first conductive connection portion, and to be open only at a lower end thereof, and wherein the internal connector (20) is provided with a housing (22) including a part (60) defining an annular recess (62) opened upward on an outer periphery thereof, the lower end of the outer shell member (64) being received in the annular recess (62) when the electronic control unit (50) is connected to the internal connector (20).

Thereby, by placing liquid in the annular recess (62), a seal is provided for the conductive connection portion between the electronic control unit (50) and the internal connector (20). As a result, even if the conductive connection portion between the electronic control unit and the internal connector is positioned in an environment where oil mist or electroconductive substances float, the conductive connection portion between the electronic control unit and the internal connector is prevented from being subjected to electric conductance impairment by the oil mist or electroconductive substances in a reliable manner.

In this connector connection structure, preferably, the outer shell member (64) has an inner surface including a part that abuts against an outer surface of the housing (22) adjacent to the lower end thereof.

Since the inner surface of the outer shell member (64) comes into contact with the outer surface of the housing (22), the electronic control unit (50) can be connected to the internal connector (20) in a guided manner.

In this connector connection structure, preferably, the connector connection structure further includes an external connector (30) positioned on the casing (10), wherein the electronic control unit (50) is provided with a second conductive connection portion at an upper end of the main part (54) to be electrically connected to the external connector (30), and the main part (54) is provided with a part opposing an opening (16) formed in the casing (10), an outer periphery of the main part being provided with a first seal member (70) that closes the opening (16) in a state where the electronic control unit (50) is not connected to the external connector (30) and is connected to the internal connector (20).

Since the electronic control unit (50) can be removed from the internal connector (20), the electronic control unit

(50) can be replaced in an efficient manner, and when the external connector (30) is removed for maintenance purposes, the first seal member (70) prevents foreign matter from entering the casing (10).

In this connector connection structure, preferably, the external connector (30) is provided with a tubular portion (37) having a part opposing the opening (16) in a state where the electronic control unit (50) is connected to the internal connector (20) and the external connector (30), and the first seal member (70) is configured to be selectively in a first state where the first seal member (70) abuts against an inner peripheral surface of the opening (16) to provide a seal between the casing (10) and the electronic control unit (50) when the electronic control unit (50) is connected to the internal connector (20) and the electronic control unit (50) is not connected to the external connector (30), and a second state where the first seal member (70) abuts against the inner peripheral surface of the tubular portion (37) to provide a seal between the electronic control unit (50) and the external connector (30) when the electronic control unit (50) is connected to the external connector (30).

Thereby, the first seal member (70) is in the first state to provide a seal between the casing (10) and the electronic control unit (50) when the electronic control unit (50) is not connected to the external connector (30), and in the second state to provide a seal between the electronic control unit (50) and the external connector (30) when the electronic control unit (50) is connected to the external connector (30).

In this connector connection structure, preferably, the first seal member (70) is made of rubber, and is provided with a base part (72) fixed to an outer periphery of the main part (54), and a lip portion (74) including a radially extending free end (74A) so that the free end (74A) is configured to abut against the inner peripheral surface of the opening (16) and the inner peripheral surface of the tubular portion (37) under an elastic deformation of the lip portion (74).

Thereby, the first seal member (70) automatically takes the first state and the second state owing to the elastic deformation of the lip portion (74), and provides a favorable sealing in either state.

Preferably, this connector connection structure further includes a second seal member (42) attached to an outer periphery of the tubular portion (37) to provide a seal between the electronic control unit (50) and the casing (10) at the opening (16).

Thereby, when the external connector (30) is connected to the electronic control unit (50), the second seal member (42) prevents foreign matter from entering the casing (10).

Effect of the Invention

According to the connector connection structure of the present invention, electric conductance impairment of an electric connecting part between an electronic control unit and an internal connector can be prevented in a reliable manner even when the electric connecting part between the electronic control unit and the internal connector is placed in an environment where oil mist or electroconductive substances are present.

BRIEF DESCRIPTION OF THE DRAWINGS

FIG. 3 is an exploded perspective view of the connector connecting structure of the present embodiment.

DETAILED DESCRIPTION OF THE PREFERRED EMBODIMENT(S)

Figure 1:
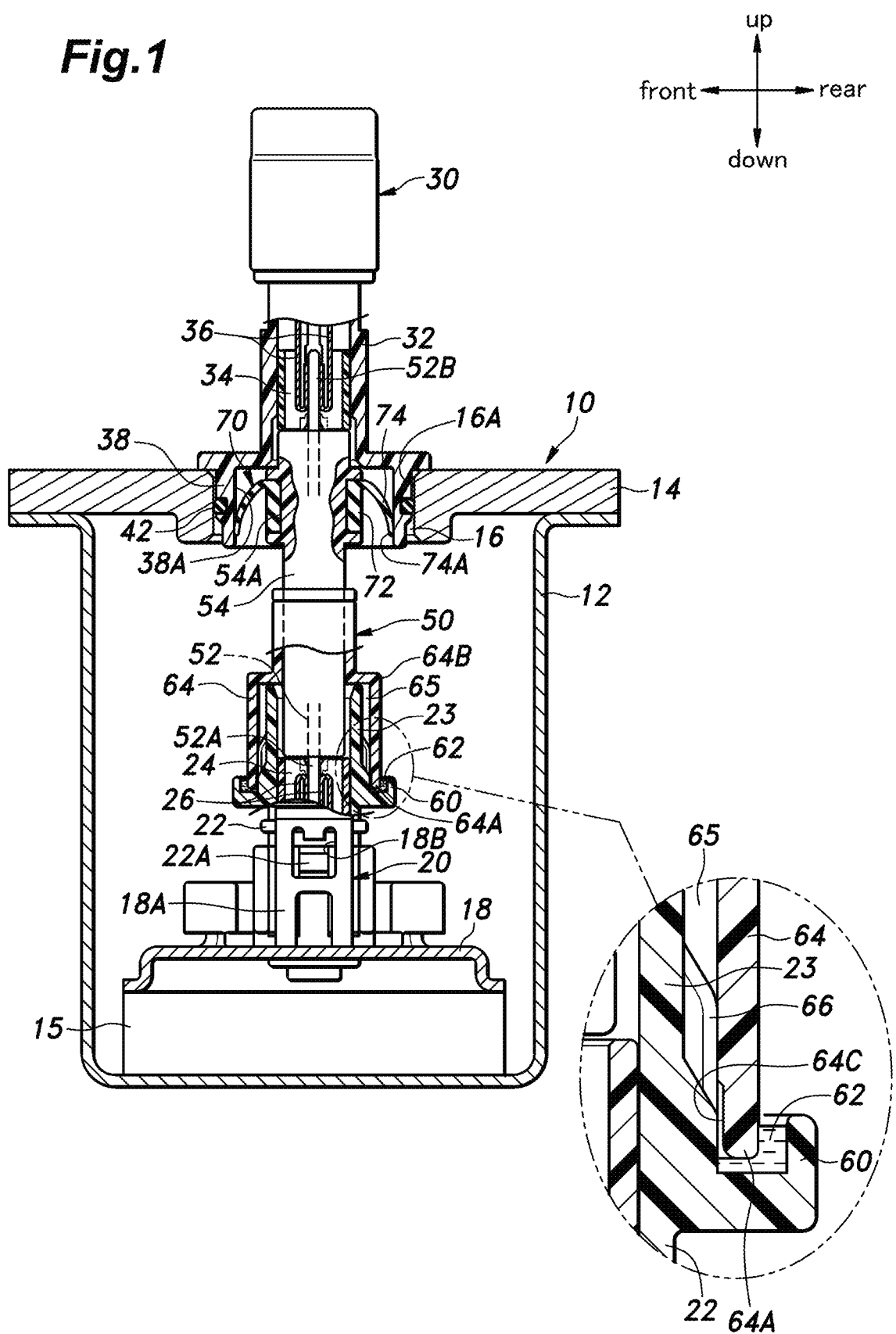
FIG. 1 is a view of a connector connecting structure according to an embodiment of the present invention partly in section with an external connector not connected.

A connector connection structure according to an embodiment of the present invention will be described in the following with reference to FIGS. 1 to 3.

The connector connection structure of the present embodiment includes a casing 10, an internal connector 20 positioned inside the casing 10, an external connector 30 positioned outside the casing 10, and an electronic control unit 50 electrically connected to both the internal connector 20 and the external connector 30.

The casing 10 has a sealed structure including a box-shaped casing main body 12 having an open upper end, and a flat cover plate 14 attached to the upper end of the casing main body 12 so as to close the upper opening of the casing main body 12 and form an outer shell member of an engine, transmission or the like. The casing 10 is internally provided with a mechanical moving part such as a gear train which is lubricated by oil mist.

A control object device 15 to be controlled by the electronic control unit 50 is placed at the bottom of the casing 10. The cover plate 14 is formed with an opening 16 for placing the electronic control unit 50 into the casing 10.

A connector mounting plate 18 is attached to the upper end of the control object device 15. The connector mounting plate 18 is provided with a pair of upright pieces 18A located on either lateral side thereof. Each upright piece 18A is provided with an engagement hole 18B which is engaged by an engagement protrusion 22A formed on the corresponding side of an outer wall of a housing 22 of the internal connector 20. Owing to this engagement, the internal connector 20 is mounted to the connector mounting plate 18.

The internal connector 20 is a double-sided card edge connector including a plurality of female terminals 26 placed in a terminal chamber 24 formed in a tubular portion 23 formed in the housing 22 so as to have an open upper end.

The external connector 30 is a double-sided card edge connector including a plurality of female terminals 36 placed in a terminal chamber 34 formed in a housing 32 of the external connector 30 so as to have an open lower end.

The electronic control unit 50 includes a main part 54 having a rectangular shape and containing a main part of a printed circuit board 52, and CPU and other electronic components (not shown in the drawings) mounted on the main part of the printed circuit board 52, all molded in electrically insulating resin, a first conductive connection portion 56 (terminals) (see FIG. 3) formed on both sides of a first card edge portion 52A extending downward from the lower edge of the main part 54 of the printed circuit board 52, and a second conductive connection portion 58 (terminals) (see FIG. 3) formed on both sides of a second card edge portion 52B extending upward from the upper edge of the main part 54 of the printed circuit board 52. The first conductive connection portion 56 is configured to be electrically connected to the female terminals 26 of the internal connector 20. In other words, the electronic control unit 50 is configured to be connected to the internal connector 20 from above so as to be electrically connected to the internal connector 20. The second conductive connection portion 58 is configured to be electrically connected to the female terminals 36 of the external connector 30.

Figure 2:
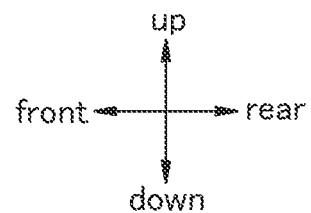
FIG. 2 is a view of the connector connecting structure of the present embodiment partly in section with the external connector removed.
Figure 2:
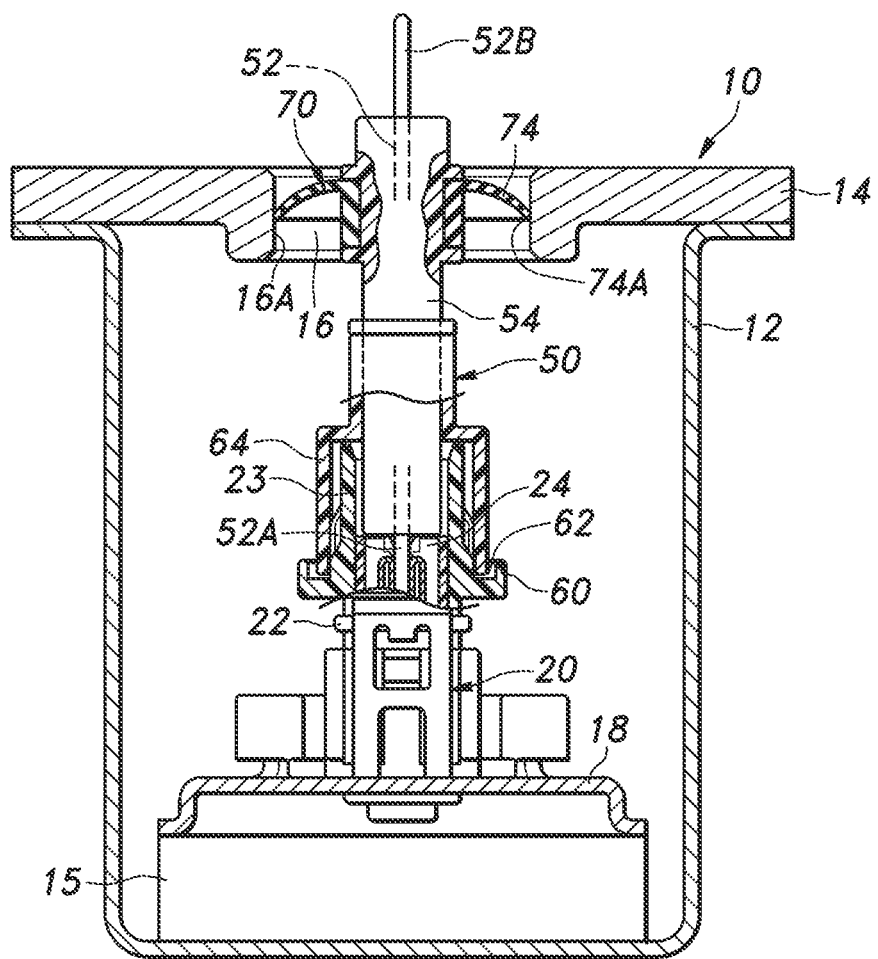

As shown in FIG. 1, a first seal member 70 is attached to the outer periphery of the main part 54 of the electronic control unit 50 which opposes the periphery of the opening 16 in the connected state of the electronic control unit 50 to the internal connector 20 in which the first conductive connection portion 56 contacts the female terminals 26. The first seal member 70 is made of rubber, and includes a base part 72 fixed to the outer periphery of the main part 54 by being fitted into a peripheral groove 54A formed in the outer periphery of the main part 54 and a thin-walled lip portion 74 provided with a free end 74A extending radially outward from the main part 54 like an umbrella.

As shown in FIG. 3, the opening 16 is similar in shape to the outer profile of the part of the main part 54 located in the opening 16 in plan view, and has an oval shape elongated in the lateral direction. Similarly, the first seal member 70 is similar in shape to the outer profile of the part of the main part 54 located at the opening 16 in plan view, and has an oval annular shape extending along the entire circumference of this part of the main part 54.

The first seal member 70 is configured to be in a first state where the free end 74A of the lip portion 74 abuts against (contacts) the inner peripheral surface 16A of the opening 16 so as to close the opening 16 and provide a seal between the casing 10 and the electronic control unit 50 when the electronic control unit 50 is connected to the internal connector 20 and the external connector 30 is not connected to the electronic control unit 50.

As a result, foreign matter is prevented from entering the casing 10 through the opening 16 in a state where the external connector 30 is not connected to the electronic control unit 50.

The part of the housing 32 opposing the opening 16 in a state where the external connector 30 is connected to the electronic control unit 50 is provided with a tubular portion 38 which is similar in shape to the opening 16 in plan view. The outer periphery of the tubular portion 38 is fitted with a second seal member 42. The second seal member 42 may be an O-ring made of rubber or the like, and a seal is provided between the electronic control unit 50 and the casing 10 at the opening 16 by abutting (contacting) the inner peripheral surface 16A of the opening 16 in a state where the external connector 30 is connected to the electronic control unit 50.

As a result, foreign matter is prevented from entering the casing 10 from the opening 16 in a state where the electronic control unit 50 is connected to the internal connector 20 and the external connector 30 is connected to the electronic control unit 50.

When the external connector 30 is inserted into the opening 16 from above (outside of) the housing 32 to be connected to the electronic control unit 50, the tubular portion 38 of the external connector 30 abuts against the lip portion 74 of the first seal member 70 so as to elastically deform the lip portion 74.

Thus, as shown in FIG. 1, when the external connector 30 is connected to the electronic control unit 50, the first seal member 70 takes a second state in which the first seal member 70 is in contact with the inner peripheral surface 38A of the tubular portion 38. In the second state, a seal is provided between the external connector 30 and the electronic control unit 50 so that foreign matter is prevented from entering the electric connection portion between the external connector 30 and the electronic control unit 50.

In a completely connected state in which the electronic control unit 50 is connected to the internal connector 20 and the external connector 30 is connected to the electronic control unit 50, the external connector 30 can be fixed to the casing 10 by bolts 44 (see FIG. 3) engaged by external connector 30 being screwed into screw holes 17 formed in the cover plate 14.

The outer periphery of the tubular portion 23 of the housing 22 of the internal connector 20 is provided with an overhanging portion 60 defining an annular recess 62 opened upward. The annular recess 62 extends substantially horizontally over the entire circumference of the outer periphery of the housing 22. A shoulder portion 60A is formed in a part of the outer peripheral surface of the tubular portion 23 corresponding to the overhanging portion 60, and the shoulder portion 60A of the tubular portion 23 is provided with a plurality of ribs 66 arranged circumferentially around the tubular portion 23.

The ribs 66 are each provided with an outer surface that forms a part of the general outer surface of the housing and abuts on the inner surface of an outer shell member 64 (which will be described hereinafter), and the sliding contact between the outer surface of the ribs 66 and the inner surface of the outer shell member 64 guides the vertical movement of the outer shell member 64.

As a result, the electronic control unit 50 can be connected to the internal connector 20 in an accurate manner and free from play, and the work efficiency in connecting the electronic control unit 50 to the internal connector 20 is improved.

The outer shell member 64 consisting of a tubular member is attached to the electronic control unit 50 so as to surround the main part 54 thereof. The outer shell member 64 defines a gap 65 in cooperation with the main part 54, and the gap 65 is open only at the lower end thereof so that the tubular portion 23 of the internal connector 20 can be passed into the gap from below. The vertical dimension of the outer shell member 64 is selected such that the lower end 64A of the outer shell member 64 is received in the annular recess 62 and the upper end 64B of the outer shell member 64 reaches the upper edge of the tubular portion 23 in the state where the electronic control unit 50 is connected to the internal connector 20.

The part of the outer shell member 64 adjoining the lower end thereof which is received in the annular recess 62 is formed as a thin-walled portion 64C such that the inner surface of the outer shell member 64 is offset from the outer surface of the tubular portion 23. Thereby, the liquid (oil) level in the space between the outer surface of the tubular portion 23 and the inner surface of the outer shell member 64 is prevented from rising due to the surface tension.

A part of the oil mist permeating in the casing 10 falls into the annular recess 62. As a result, oil is deposited in the annular recess 62 so that the oil mist is prevented from passing under the lower end 64A of the outer shell member 64, and entering the gap 65 on account of the liquid oil deposited in the annular recess 62.

As a result, oil mist is prevented from entering the contact portion between the female terminals 26 and the first conductive connection portion 56 in the terminal chamber 24, and electric conduction impairment due to the oil mist is avoided.

When the liquid level of the oil deposited in the annular recess 62 reaches the upper edge of the annular recess 62, the oil in the annular recess 62 overflows from the upper edge of the annular recess 62 to the outside (inside the casing 10), but the state where oil is deposited in the annular recess 62 is maintained.

When the temperature inside the terminal chamber 24 and the gap 65, or in other words, inside the outer shell member 64 rises due to the heat generated by the electronic control unit 50 to such an extent that the internal pressure of the outer shell member 64 becomes higher than the external pressure of the outer shell member 64, the resulting pressure difference causes the oil trapped between the outer shell member 64 and the tubular portion 23 is expelled outward. Conversely, when the temperature inside the outer shell member 64 drops to such an extent that the internal pressure of the outer shell member 64 becomes lower than the external pressure of the outer shell member 64, oil is drawn into the space defined between the outer shell member 64 and the tubular portion 23. However, since the upper end of the tubular portion 23 is sufficiently higher than the annular recess 62, the oil is prevented from going over the upper edge of the tubular portion 23, and flowing into the terminal chamber 24.

As described above, since the seal between the electronic control unit 50 and the internal connector 20 is provided by the oil deposited in the annular recess 62 without requiring any tight contact, the force required to connect and disconnect the electronic control unit 50 and the internal connector 20 to and away from each other is reduced as compared to the case where the seal is provided by fitting a seal member made of rubber.

Further, even if a mechanical moving part (not shown in the drawings) such as a gear train is provided in the casing 10 and metal dust due to wear or the like is floating or permeating in the casing 10, the metal dust is prevented from reaching the contact portion between the female terminals 26 and the first conductive connection portion 56 in the terminal chamber 24 by contacting the oil deposited in the annular recess 62 and sinking to the bottom of the annular recess 62.

Thereby, the metal dust is prevented from infiltrating into the contact portion between the female terminals 26 and the first conductive connection portion 56, and any electric conductance impairment due to metal dust can be avoided.

The present invention has been described above in terms of a preferred embodiment thereof, but as can be easily appreciated by those skilled in the art, is not limited to such an embodiment and may be modified in various ways without departing from the scope of the present invention. In addition, not all of the components shown in the above embodiment are indispensable, and they can be appropriately selected without deviating from the gist of the present invention.

LIST OF REFERENCE NUMERALS

| | |
|---|---|
| 10: casing | 12: casing main body |
| 14: cover plate | 15: control object device |
| 16: opening | 17: screw hole |
| 18: connector mounting plate | 18A: upright piece |
| 18B: engagement hole | 20: internal connector |
| 22: housing | 22A: engagement protrusion |
| 23: tubular portion | 24: terminal chamber |
| 26: female terminal | 30: external connector |
| 32: housing | 33: flange |
| 34: terminal chamber | 36: female terminal |
| 38: tubular portion | 38A: inner peripheral surface |
| 42: second seal member | 44: bolt |
| 50: electronic control unit | 52: printed circuit board |
| 52A: first card edge portion | 52B: second card edge portion |

-continued

LIST OF REFERENCE NUMERALS

| | |
|---|---|
| 54: main part | 54A: peripheral groove |
| 56: first conductive connection portion | 58: second conductive connection portion |
| 60: overhanging portion | 60A: shoulder portion |
| 64: outer shell member | 64A: lower end |
| 64B: upper end | 64C: thin-walled portion |
| 65: gap | 66: rib |
| 70: first seal member | 72: base part |
| 74: lip portion | 74A: free end |
| 80: first seal member | 82: base part |

The invention claimed is:

1. A connector connection structure, including:
an internal connector positioned inside a casing, and
an electronic control unit configured to be electrically connected to the internal connector from above with respect to the internal connector,
wherein the electronic control unit includes:
a main part,
a first conductive connection portion provided at a lower end of the main part and configured to be electrically connected to the internal connector, and
an outer shell member extending downward so as to surround the first conductive connection portion, and to be open only at a lower end thereof,
wherein the internal connector is provided with terminals configured to be connected to the first conductive connection portion and a housing including a tubular portion having an open upper end and defining a terminal chamber in which the terminals are placed, the tubular portion being provided with an overhanging portion defining an annular recess opened upward on an outer periphery thereof,
the lower end of the outer shell member is received in the annular recess when the electronic control unit is connected to the internal connector,
the overhanging portion has an upper edge positioned lower than an upper edge of the tubular portion, and
the upper edge of the overhanging portion is positioned higher than the lower end of the outer shell member such that liquid oil deposited in the annular recess has a liquid surface positioned higher than the lower end of the outer shell member.

2. The connector connection structure according to claim 1, wherein the outer shell member has an inner surface including a part that abuts against an outer surface of the housing adjacent to the lower end thereof.

3. The connector connection structure according to claim 1, further including an external connector positioned outside the casing,
wherein the electronic control unit is provided with a second conductive connection portion at an upper end of the main part to be electrically connected to the external connector, and the main part is provided with a part opposing an opening formed in the casing, and
an outer periphery of the main part being provided with a first seal member that closes the opening in a state where the electronic control unit is not connected to the external connector and is connected to the internal connector.

4. The connector connection structure according to claim 3, wherein the external connector is provided with a tubular portion having a part opposing the opening in a state where the electronic control unit is connected to the internal connector and the external connector, and the first seal member is configured to be selectively in a first state where the first seal member abuts against an inner peripheral surface of the opening to provide a seal between the casing and the electronic control unit when the electronic control unit is connected to the internal connector and the electronic control unit is not connected to the external connector, and a second state where the first seal member abuts against an inner peripheral surface of the tubular portion of the external connector to provide a seal between the electronic control unit and the external connector when the electronic control unit is connected to the external connector.

5. The connector connection structure according to claim 4, wherein the first seal member is made of rubber, and is provided with a base part fixed to an outer periphery of the main part, and a lip portion including a radially extending free end so that the free end is configured to abut against the inner peripheral surface of the opening and the inner peripheral surface of the tubular portion of the external connector under an elastic deformation of the lip portion.

6. The connector connection structure according to claim 4, further including a second seal member attached to an outer periphery of the external connector to provide a seal between the electronic control unit and the casing at the opening.

* * * * *